United States Patent [19]
Yokogawa

[11] Patent Number: 5,914,920
[45] Date of Patent: Jun. 22, 1999

[54] CONSTANT ANGULAR VELOCITY TYPE OPTICAL DISK, DOUBLE DENSITY RECORDING METHOD THEREFOR, AND REPRODUCING METHOD FOR SUCH RECORDED OPTICAL DISK

[75] Inventor: Fumihiko Yokogawa, Kawagoe, Japan

[73] Assignee: Pioneer Electronic Corporation, Tokyo-to, Japan

[21] Appl. No.: 08/122,611

[22] Filed: Sep. 15, 1993

Related U.S. Application Data

[63] Continuation of application No. 07/855,775, Mar. 23, 1992, abandoned.

[30] Foreign Application Priority Data

Mar. 28, 1991 [JP] Japan .................................. P 3-064978

[51] Int. Cl.⁶ .................................................. G11B 7/095
[52] U.S. Cl. ..................................... 369/44.26; 369/275.3
[58] Field of Search ........................... 369/44.26, 44.34, 369/44.28, 47, 50, 275.3, 59, 44.41, 44.37, 44.13, 275.1, 275.4; 360/49

[56] References Cited

U.S. PATENT DOCUMENTS

| | | | |
|---|---|---|---|
| 4,779,253 | 10/1988 | Getreuer et al. ...................... | 369/44.26 |
| 4,967,403 | 10/1990 | Ogawa et al. ........................ | 369/44.26 |
| 4,980,877 | 12/1990 | Sugiyama .............................. | 369/44.41 |
| 5,063,546 | 11/1991 | Ito et al. ................................ | 369/50 X |
| 5,065,382 | 11/1991 | Seko et al. ............................ | 369/44.26 |
| 5,270,991 | 12/1993 | Verboom .............................. | 369/44.26 |

*Primary Examiner*—Thang V. Tran
*Attorney, Agent, or Firm*—Kane, Dalsimer, Sullivan, Kurucz, Levy, Eisele and Richard, LLP

[57] ABSTRACT

There is disclosed a double density recording method for a constant angular velocity type optical disk in which a data information area for recording data information and a servo information area for recording servo control information are provided in recording tracks of the optical disk, pairs of wobble pits for tracking servo control being provided in a staggered form in the servo control area in such a manner that the center axes of the recording tracks are put between the respective pairs of wobble pits, the method being adapted to carry out a subtractive operation of reflected light signals from the respective wobble pits to generate a tracking error signal to thereby conduct a tracking servo control, and to record data information under such a tracking servo control, wherein the respective pair of wobble pits are provided in such a manner that they are shared as wobble pits of adjacent recording tracks, and the wobble pits are provided in a staggered form in a radial direction of the optical disk.

17 Claims, 5 Drawing Sheets

CONSTANT ANGULAR VELOCITY TYPE OPTICAL DISK, DOUBLE DENSITY RECORDING METHOD THEREFOR, AND REPRODUCING METHOD FOR SUCH RECORDED OPTICAL DISK

This application is a continuation of application Ser. No. 07/855,775, filed Mar. 23, 1992, now abandoned.

BACKGROUND OF THE INVENTION

This invention relates to a Constant Angular Velocity (CAV) type optical disk and a recording/reproducing method therefor, and more particularly to a CAV optical disk using a sampled servo method, and a method for permitting information to be recorded onto such a CAV optical disk at a double recording density and a method for reproducing such a double density recorded CAV optical disk.

Heretofore, as a recording format of a write once type CAV optical disk, a sampled servo method or system is known. An example of such a recording format of the write once type optical disk of the sampled servo system is shown in FIG. 2. In the write once type optical disk of the sampled servo system, no pregroove (guide groove) is provided on a recording film of the write once type optical disk, and servo fields are preformatted at 1376 portions in one track. This configuration will enable the optical disk of such a recording format so as to have the ability to generate clock signals for a tracking error or a recording/reproducing operation, etc. by sampling.

As shown in FIG. 2, in a program area PA of a write once type optical disk DK, spiral signal tracks are extended from the inner circumferential side to the outer circumferential side of the write once optical disk DK. One track is divided into 32 sectors. Each sector is comprised of 43 segments, and each segment is comprised of 18 bytes. At a first segment #0 of one sector, a sector synchronizing signal $S_{sync}$ (2bits) for taking synchronization every sector and a sector address $S_{ADR}$ (16bits) for indicating an address of that sector are preformated. The preformating is carried out in the process of mastering of the write once type optical disk. Each of segments #1 to #42 is comprised of a field of 18 bytes in total of a servo field Fs of 2 bytes and a data field FD of 16 bytes.

The recording format of the servo field Fs is shown in FIG. 3. The servo field Fs of 2 bytes is divided into a servo byte #1 of one byte and a servo byte #2 of one byte. A first wobble pit $P_{w1}$ and a second wobble pit $P_{w2}$ are preformated at the third bit position of the servo byte #1 and the eighth pit position, respectively. As shown in the figure, in the case of 16 tracks (A), the first wobble pit $P_{w1}$ is located at the position of the third pit as indicated by $P_{w1A}$, but when the track position shifts to the position of 16 tracks (B), the position of the first wobble pit $P_{w1}$ shifts to the fourth bit as indicated by $P_{w1B}$. As the result of the fact that the position of the first wobble pit $P_{w1}$ is switched every 16 tracks in this way, the number of crossing tracks being searched can be precisely detected.

The first and second wobble pits $P_{w1}$ and $P_{w2}$ are arranged in a manner that they are shifted by ¼ of the track pitch in the left and right directions of tracing (radial direction of the write once optical disk DK) with the track center TC being as a center. Thus, there is provided an arrangement adapted for detecting a tracking error on the basis of a difference between a return light quantity at the first wobble pit $P_{w1}$ and a return light quantity at the second wobble pit $P_{w2}$. At the twelfth bit of the servo byte #2, a synchronizing pit $P_{SYNC}$ is preformated. Between the second wobble pit $P_{w2}$ and the synchronizing pit $P_{SYNC}$, there exists a portion of a 19 channel clock length, and this portion is mirror-finished. For a time period during which this portion is subjected to tracking, clocks of 19 channels are counted to take synchronization. At this synchronization detecting period, a focusing error detection is also carried out. A tracking signal $ST_1$ ($ST_{1A}$ or $ST_{1B}$) and a sector synchronizing signal $S_{sync}$ obtained by reading the above mentioned servo field Fs by using a laser beam are shown in FIG. 3.

A method of detecting a tracking error by wobble pits will now be described with reference to FIG. 4. Reference symbol A indicates the case where a reading beam is passed on the center axis (track center axis) of a pair of wobble pits $P_{w1}$ and $P_{w2}$, and a RF signal in that case is represented as SA. In the case where the reading beam is passed through the portion in the vicinity of pits, a quantity of a reflected light is small by diffractive action of light and that portion becomes dark. Further, when the reading beam is passed immediately above the synchronizing pit $P_{SYNC}$ as shown, the portion becomes most dark. Reference symbol B indicates the case where the reading beam is passed through the portion on the inner circumferential side of the track center axis, and a RF signal at that time is represented as SB. In this case, because the reading beam is passed immediately above the wobble pit $P_{w1}$, the dark portion by the wobble pit $P_{w1}$ has a degree of darkness greter than that of the dark portion by the wobble pit $P_{w2}$. In addition, reference symbol C shows the case where the reading beam is passed through the portion on the outer circumferential side of the track center axis. $A_{RF}$ signal in this case is represented as SC having a waveform opposite to that of SB.

Here, a signal value obtained by carrying out a signal sampling at the time of the wobble pit $P_{w1}$ is assumed as a SAMPLE ($T_1$), and a signal value obtained by carrying out a signal sampling at the time of the wobble pit $P_{w2}$ is assumed as a SAMPLE ($T_2$). In the case of A, a difference therebetween expressed as SAMPLE ($T_1$)−SAMPLE ($T_2$) is equal to zero; in the case of B, that difference takes a negative value; and in the case of C, that difference takes a positive value. Accordingly, when the expression of SAMPLE ($T_1$)−SAMPLE ($T_2$)=TE is employed, it is possible to utilize TE as a tracking error signal.

In accordance with the above described conventional sampled servo system, an approach is employed to form, in advance, wobble pits $P_{w1}$ and $P_{w2}$ for servo control and a synchronizing pit $P_{SYNC}$ on an optical disk (prepits) to provide various information for servo control such as a tracking error signal, etc. from these pit trains.

However, the track pitch width determining a recording density of an optical disk could not be held down to a predetermined value by the relationship between the track pitch width and a spot width of a laser beam. Namely, as shown in FIG. 5(A), a laser beam spot diameter BL ordinarily used is about 1 to 1.6 µm (1.2 µm in average) although it depends upon its wavelength, and the minimum pit width L which can be read by that beam spot diameter is about 0.4 µm. Accordingly, there holds the relationship expressed as BL=3L. In the case of reading information, a laser beam reflected at the portion of the signal pit PT is diffracted by pits, so a quantity of a light returning to the optical pickup becomes small. Thus, this portion can be grasped or considered as a dark portion. In contrast, since the intermediate portion between signal pits PT is mirror-finished, a laser light is entirely reflected thereat, resulting in much quantity of a return light. Thus, that portion can be grasped as a bright portion. In order to accurately read servo information, it is necessary to read such bright and dark portions without an error. To realize this, however, a track pitch width Tp of about 1.6 μm (corresponding to 4L) was conventionally required.

In order to improve the recording density of the optical disk DK, it is necessary to further shorten the wavelength thus to reduce the dimension of pit, or to further shorten the track pitch width. In the present state, however, there is a limit in reduction of a laser beam. On the other hand, when consideration is made in connection with the case where the track pitch width Tp is reduced to about 2L (about 0.8 μm) as shown in FIG. 5(B) or 5(C), a difference between a light quantity in the case of FIG. 5(B) corresponding to the on-track state where a laser beam center is positioned on the track axis center and a light quantity in the case of FIG. 5(C) corresponding to the off-track state where the laser beam center deviates from the track axis center becomes small, resulting in the possibility that servo control cannot be precisely conducted.

SUMMARY OF THE INVENTION

With the above in view, an object of this invention is to provide a CAV optical disk of the sampled servo system suitable for a double density recording, a method capable of recording information at a recording density twice greater than that in the prior art without giving any hindrance to a servo control, and a method capable of effectively reproducing such a double density recorded CAV optical disk.

To achieve the above mentioned object, according to a first aspect of this invention, there is provided a constant angular velocity type optical disk wherein a data information area for recording data information and a servo information area for recording servo control information are provided in recording tracks of the constant angular velocity type optical disk, wherein pairs of wobble pits for tracking servo control are provided in a staggered form in the servo control area with the center axes of the recording tracks being put between the respective pairs of wobble pits, and wherein the respective pairs of wobble pits are provided in such a manner that they are shared as wobble pits of adjacent recording tracks, and the respective wobble pits are provided in a staggered form in a radial direction of the optical disk.

Further, according to a second aspect of this invention, there is provided a double density recording method for a constant angular velocity type optical disk in which a data information area for recording data information and a servo control information area for recording servo control information are provided in recording tracks of the constant angular velocity type optical disk, pairs of wobble pits for tracking servo control being provided in a staggered form in the servo control area in a manner that the center axes of the recording tracks are put between the respective pairs of wobble pits, the method being adapted to carry out a subtractive operation of reflected light signals from the respective wobble pits to generate a tracking error signal to thereby conduct a tracking servo control, and to record data information under such a tracking servo control, wherein the respective pairs of wobble pits are provided in such a manner that they are shared as wobble pits of adjacent recording tracks, and the respective wobble pits are provided in a staggered form in a radial direction of the optical disk.

In accordance with the first and second aspects of this invention, there is provided a structure in which respective pairs of pits constituting wobble pits are shared as wobble pits of adjacent recording tracks. For this reason, this structure is equivalent to the structure that wobble pits arranged in row are thinned from the entirety of wobble pit trains, with the result that the track pitch width is reduced to one half of that in the prior art. Accordingly, the recording density becomes double. However, in the case of reproducing the optical disk thus recorded, since the arrangement of odd wobble pits and the arrangement of even wobble pits are opposite to each other, if a tracking error signal is determined as it is, polarities thereof will be opposite to each other.

To improve this, according to a third aspect of this invention, there is provided a reproducing method for a double density recorded constant angular velocity type optical disk, which is adapted to reproduce the recorded data information, while conducting a tracking servo control, from a constant angular velocity type optical disk on which data information is recorded by using the double density recording method for a constant angular velocity type optical disk featured by the second aspect of this invention, wherein the direction of a subtractive operation of reflected light signals from respective wobble pits for generating the tracking error signal is reversed in dependency upon whether a track subject to tracking is an odd track or an even track.

Accordingly, as taught by the invention of the third aspect, the direction of a subtractive operation is reversed in dependency upon whether a track subject to tracking is an odd track or an even track. Namely, in the case where, e.g., the arrangement of odd tracks is assumed as reference, when a track subject to tracking is an even track, the order of subtraction is reversed or the polarity of a subtracted result is inverted, thereby making it possible to carry out a correct tracking.

Further, according to a fourth aspect of this invention, there is provided a constant angular velocity type optical disk featured by the first aspect of the invention, wherein a track discrimination pit capable of making a discrimination between odd and even tracks is provided in the servo control information area.

Furthermore, according to a fifth aspect of this invention, there is provided a double density recording method for a constant angular velocity type optical disk featured by the second aspect of this invention, wherein a track discrimination pit capable of making a descrimination between odd and even tracks is provided in the servo control information area.

In addition, according to a sixth aspect of this invention, there is provided a reproducing method for a double density recorded constant angular velocity type optical disk, which is adapted to reproduce recorded data information, while conducting a tracking servo control, from the constant angular velocity type optical disk on which data information is recorded by using the double density recording method for constant angular velocity type optical disk featured by the fifth aspect of this invention, wherein the direction of a subtractive operation of reflected light signals from respective wobble pits for generating the tracking error signal is reversed on the basis of the track discrimination pit.

Thus, as taught by the above mentioned fourth, fifth and sixth aspects of this invention, an approach may be employed to separately provide a pit for making a discrimination between odd and even tracks, thus to carry out recording/reproduction.

DESCRIPTION OF THE PREFERRED EMBODIMENT

Figure 1:
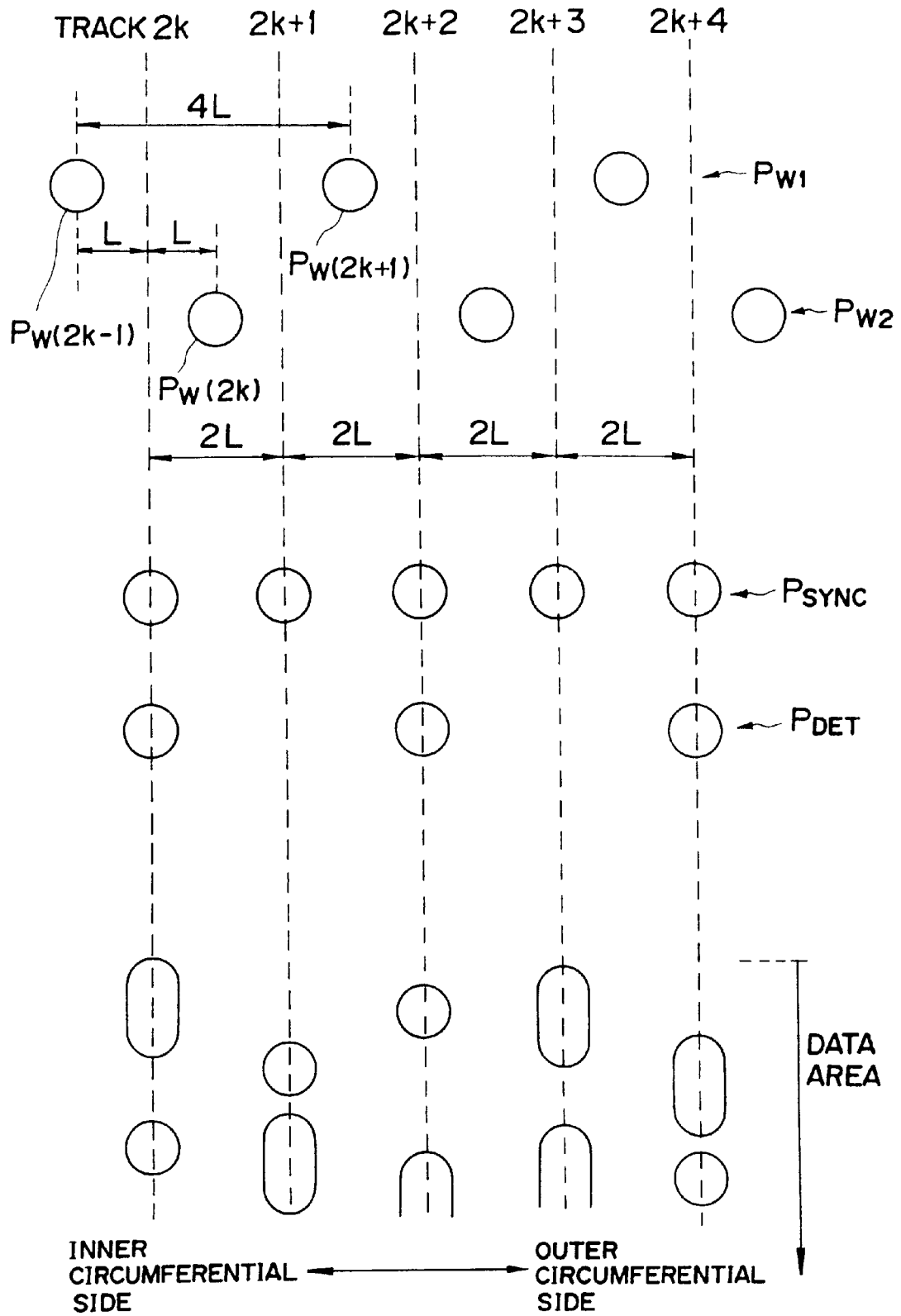
FIG. 1 is a view showing the configuration of an embodiment according to this invention.
Figure 2:
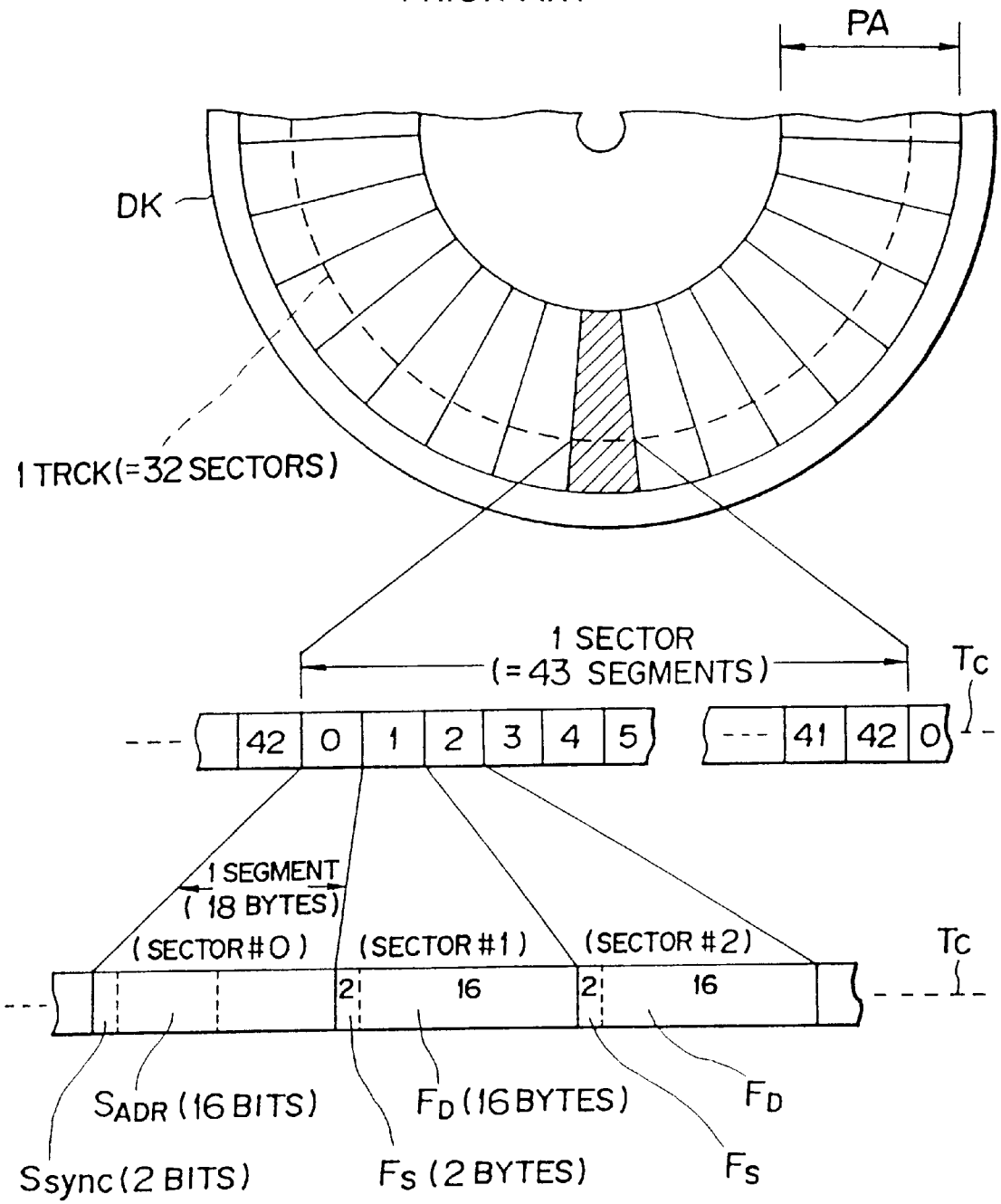
FIG. 2 is a view showing a recording format of the sampled servo system.
Figure 3:
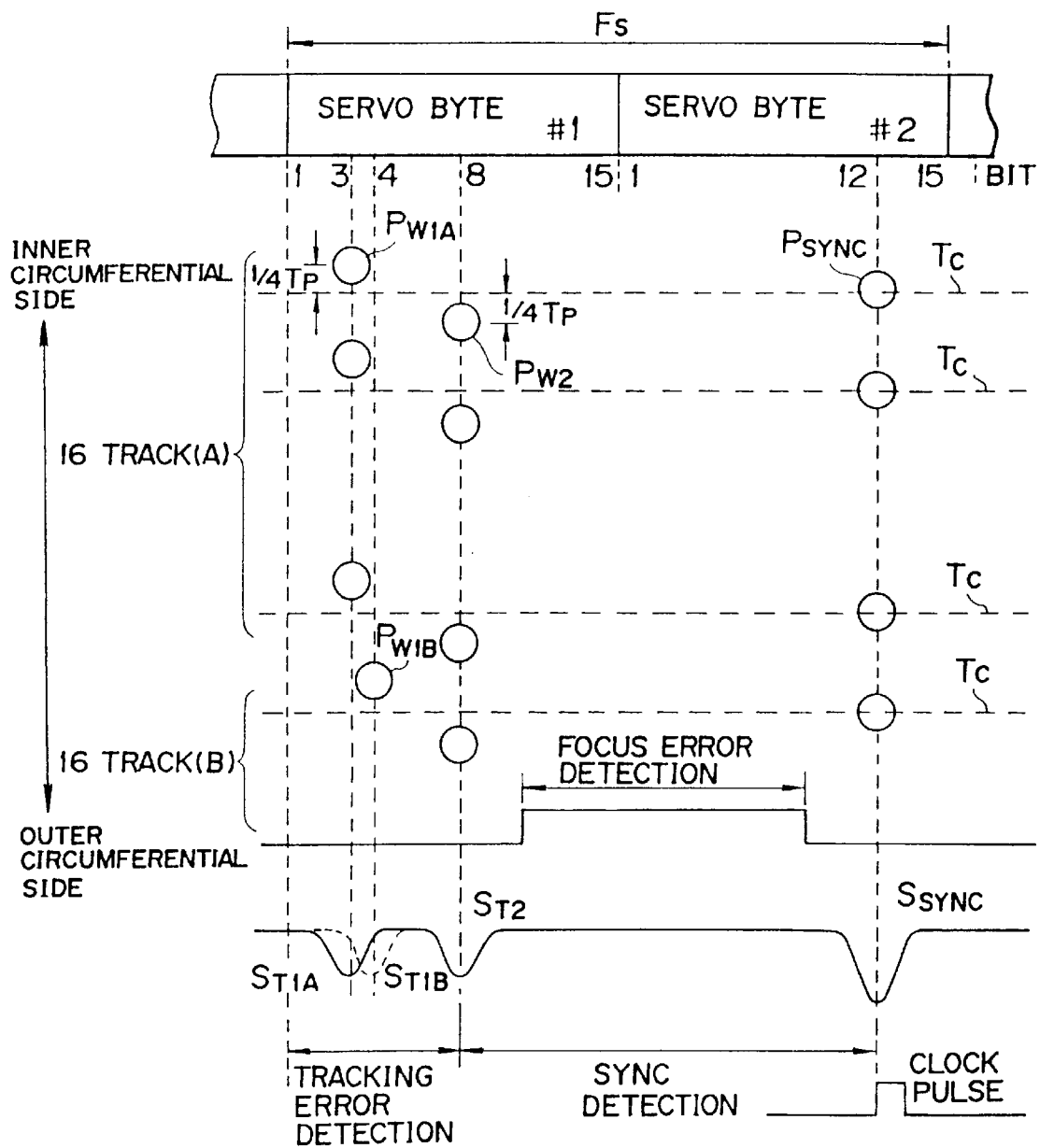
FIG. 3 is a view showing a recording format in the servo field of FIG. 2.
Figure 4:
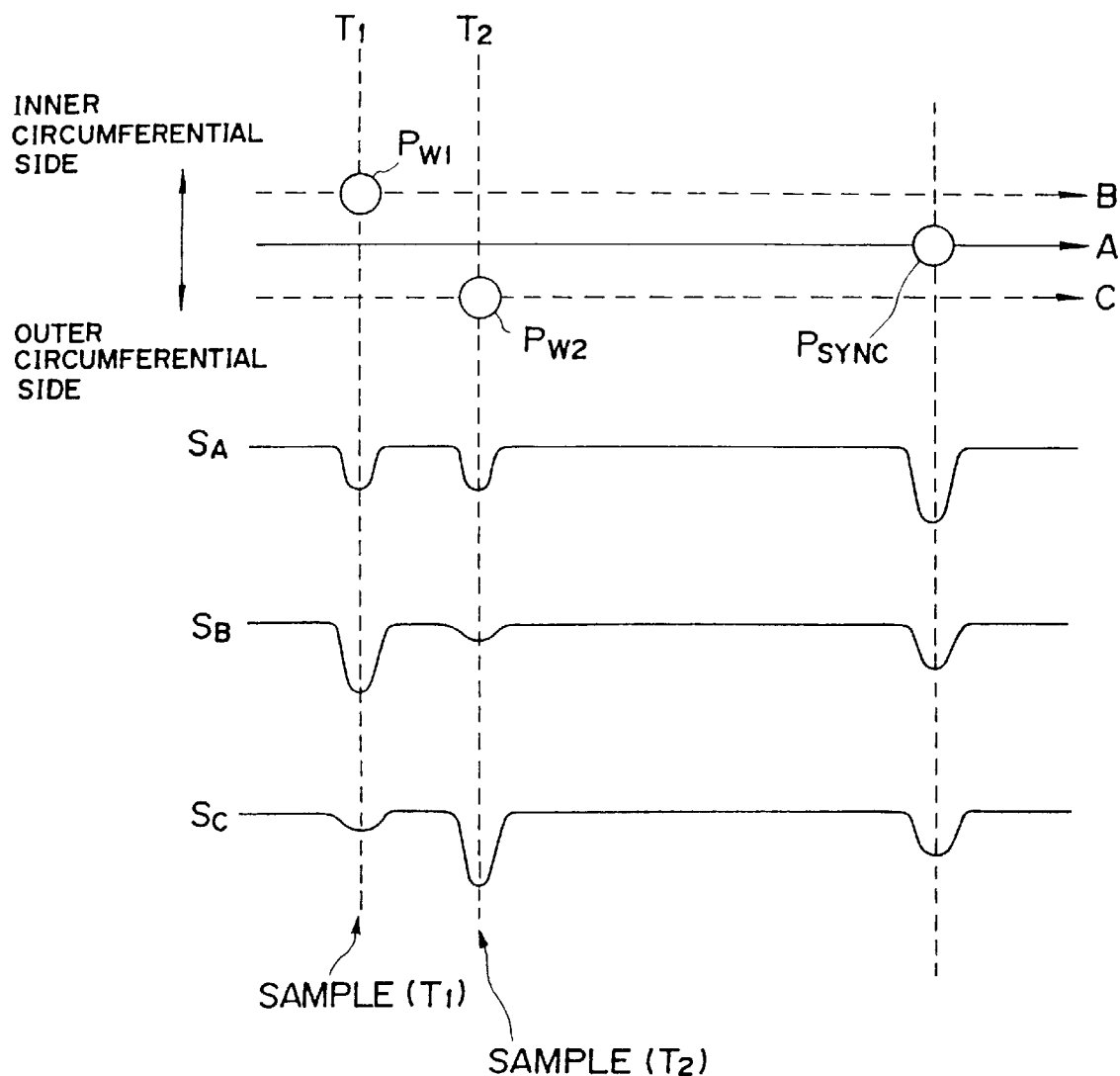
FIG. 4 is a view for explaining a tracking error detection by wobble pits.

A preferred embodiment of this invention will now be described with reference to the attached drawings. The configuration of an embodiment according to this invention is shown in FIG. 1. FIG. 1 shows the configuration of tracks and pits of a CAV optical disk used in a double density recording method of this invention. As shown, at the 2k-th track, a wobble pit Pw (2k-1) and a wobble pit Pw (2k) are provided in a manner that they are spaced in directions opposite to each other by L from the center axis of the track 2k so called in a staggered form. Further, a synchronizing pit $P_{SYNC}$ is provided on the track axis of each track and a track discrimination pit $P_{DET}$ are provided on the track axis of each even track. In addition, a data area is provided succeedingly thereto. On the other hand, the (2k+1)-th track is of a structure in which a wobble pit $P_w$ (2k) and a wobble pit $P_w$ (2k+1) are provided in a staggered form opposite to that at the 2k-th track, and synchronizing pit $P_{SYNC}$ is provided on the track axis, but no track discrimination pit $P_{DET}$ is provided.

In this case, with respect to the 2k-th track, the wobble pit $P_w$ (2k-1) corresponds to the first wobble pit $P_{w1}$, and the wobble pit $P_w$ (2k) corresponds to the second wobble pit $P_w$ (2k+1). On the contrary, with respect to the (2k+1)-th track, the wobble pit $P_w$ (2k+1) corresponds to the first wobble pit $P_{w1}$, and the wobble pit $P_w$ (2k) corresponds to the second wobble pit.

Figure 5A:
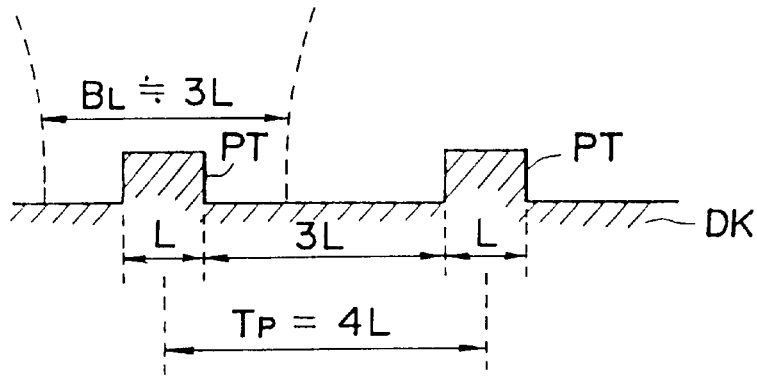
FIGS. 5A–5C are views for explaining the problems with the prior art.
Figure 5B:
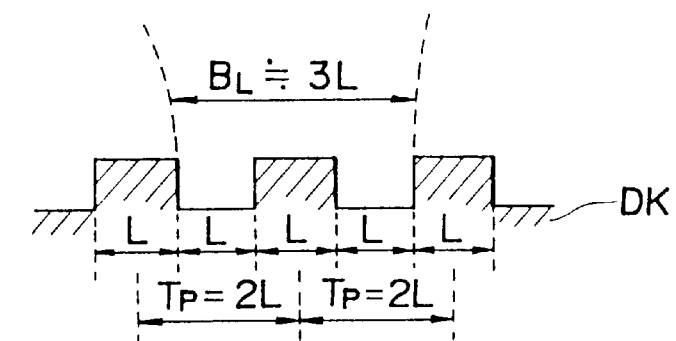
Figure 5C:
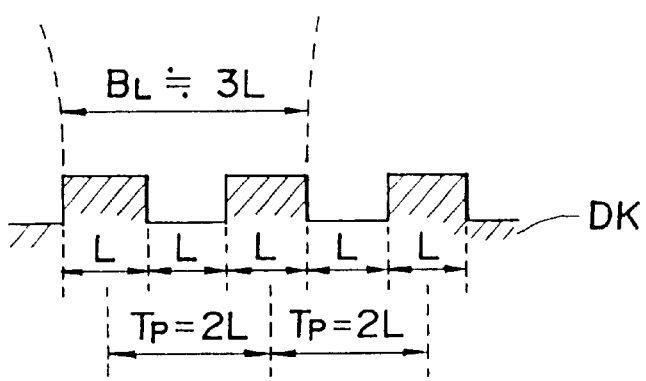

As stated above, there is employed in this embodiment a structure in a form such that the 2k-th track and the (2k+4)-th track share the wobble pit $P_w$ (2k). Accordingly, this leads to the fact that a wobble pits in a staggered form is thinned or omitted every other track, resulting in the track pitch width of Tp=2L. Namely, the track pitch width Tp is reduced to one half of Tp=4L of the prior art (FIG. 5(A)). Accordingly, the number of recordable tracks is increased so that it becomes equal to a value twice greater than that in the prior art, so the recording density becomes double.

However, when such a structure is employed as it is, since, as shown, in the case of odd tracks (2k+1, 2k+3, . . . ) the positional relationship with respect to the track center of the first and second wobble pits is opposite to that of the even tracks (2k, 2k+2, . . . ), if a tracking error signal is generated on the premise that the arrangement of even track is taken as reference, the polarity of a tracking error signal is opposite at all times in the case of odd tracks, resulting in the possibility that any tracking extraordinary state may take place.

In view of this, in this embodiment, a track discrimination pit $P_{DET}$ is additionally provided. By providing this track discrimination pit, discrimination can be made such that when $P_{DET}$ exists, a pit of question is an even pit, while when no $P_{DET}$ exists, that pit is an odd pit. Thus, in generating a tracking error signal, in the case of odd tracks, a method of reversing the order of subtraction or a method of inverting the polarity of a subtracted value, etc. is employed, thus making it possible to carry out a correct tracking operation.

In this case, the track discrimination pit may be provided at any position in a corresponding track. Moreover, when there is employed a configuration such that the polarity at the time of generating a tracking error signal is inverted every shift of track, i.e., every 32 sectors, the track discrimination pit $P_{DET}$ becomes unnecessary. Further, when a configuration as shown in FIG. 1 is employed, the pitch in a radial direction of the synchronizing pit $P_{SYNC}$ becomes a value twice greater than that of the prior art, resulting in the accompanying effect that detection of the synchronizing clock is more easily carried out. Furthermore, detection of direction may be made by making use of the pit for discrimination between odd and even pits.

In the above system, a MCAV system (Modified-CAV) to switch the number of servo bytes every plural tracks may be carried out. In addition, by canceling crosstalk in the data reading operation, C/N ratio can be also improved.

As described above, in accordance with this invention, in recording/reproduction of a CAV optical disk based on the sampled servo system, wobble pits are provided in such a manner that they are shared by adjacent tracks. At the time of reproduction, the polarity at the time of generating a tracking error signal is inverted every track. Thus, information can be advantageously recorded/reproduced at a recording density twice greater than that in the prior art without impeding a servo control.

The invention may be embodied in other specific forms without departing from the spirit or essential charactristics thereof. The present embodiment is therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A constant angular velocity type optical disk comprising:

recording tracks;

a data information area for recording data information ad a servo control information area for recording servo control information in the recording tracks;

pairs of wobble pits for tracking servo control, the wobble pits of each pair being adjacently arranged along one recording track in the servo control information area and provided in a staggered form in a radial direction of the optical disk with a center axis of said one recording track being disposed between the wobble pits of said each pair, wherein a pair of wobble pits is free of information therebetween; and a track discrimination pit disposed in each said servo control information area and capable of discriminating between odd and even tracks, wherein each wobble pit between two adjacent recording tracks is shared by both adjacent recording tracks as a wobble pit on an outer circumferential side of one of the adjacent recording tracks and as a wobble, pit on an inner circumferential side of the other of the adjacent recording tracks which is situated at an outer circumferential side of said one of the adjacent recording tracks, and said track discrimination pit is disposed on only one of the even and odd tracks at each predetermined area where the servo control information is sampled at a predetermined timing in said servo control information area.

2. The constant angular velocity type optical disk of claim 1 wherein a pitch between said recording tracks as measured along a radius of the optical disk is substantially equal to twice the width of the wobble pits.

3. The constant angular velocity type optical disk of claim 1 wherein each pair of wobble pits includes a first wobble pit and a second wobble pit, wherein said first wobble pit is on a first circumferential side of a given recording track and said second wobble pit is at an immediately successive data position on a second circumferential side of said given recording track.

4. The constant angular velocity type optical disk of claim 1 wherein respective wobble pits chosen from a plurality of pairs lie on a line perpendicular to aid recording tracks along a radius of the optical disk.

5. The constant angular velocity type optical disk according to claim 1, wherein the track discrimination pit comprises a single pit capable of discriminating between the odd and even tracks.

6. A double density recording method for a constant angular velocity type optical disk in which a data information area for recording data information and a servo control information area for recording servo control information are provided in recording tracks of the constant angular velocity type optical disk, pairs of wobble pits for tracking servo control being provided in the servo control information area, the wobble pits of each pair being adjacently arranged along one rereading track in the servo control information area and provided in a staggered form in a radial direction of said optical disk such that a center axis of said one recording track is disposed between the wobble pits in said each pair, wherein said each pair of wobble pits is free of information therebetween, a track discrimination pit disposed in said servo control information area capable of discriminating between odd and even tracks, wherein each wobble pit between two adjacent recording tracks is shared by both adjacent recording tracks as a wobble pit on an outer circumferential side of one of the adjacent recording tracks and as a wobble pit on an inner circumferential side of the other of the adjacent recording tracks which is situated at an outer circumferential side of said one of the adjacent recording tracks, and said track discrimination pit is disposed on only one of the even and odd tracks at each predetermined area where each said servo control information is sampled at a predetermined timing in said servo control information area, said recording method comprising the steps of:

detecting reflected light signals from the respective wobble pits such that the servo control information in said each predetermined area in said servo control information area is respectively sampled at the predetermined timing;

generating a tracking error signal by subtracting the value of the detected light signal of one of the pair of wobble pits from the value of the detected light signal of the other of the pair of wobble pits and by selectively inverting the subtracted value in dependency upon whether a track subject to tracking is the odd track or the even track according to said track discrimination pit;

conducting a tracking servo control on the basis of the generated tracking error signal; and recording data information onto the data information area while conducting the tracking servo control.

7. The double density recording method of claim 6 wherein a pitch between said recording tracks as measured along a radius of the optical disk is substantially equal to twice the width of the wobble pits.

8. The double density recording method of claim 6 wherein each pair of wobble pits includes a first wobble pit and a second wobble pit, wherein said first wobble pit is on a first circumferential side of a given recording track and said second wobble pit is at an immediately successive data position on a second circumferential side of said given recording track.

9. The double density recording method of claim 6 wherein respective wobble pits chosen from a plurality of pairs lie on a line perpendicular to aid recording tracks along a radius of the optical disk.

10. The double density recording method of claim 6 comprising the further step of forming a laser beam spot having a predetermined diameter onto said optical disk to detect the reflected light signals, wherein a pit width of each wobble pit is prescribed such that the predetermined diameter is substantially equal to three times the pit width.

11. The double density recording method according to claim 6, wherein the track discrimination pit comprises a single pit capable of discriminating between the odd and even tracks and, in the tracking error signal generating step, the tracking error signal is generated in dependency upon whether the track subject to tracking is the odd track or the even track according to said single pit.

12. A reproducing method for a double density recorded constant angular velocity type optical disk in which a data information area for recording data information and a servo control information area for recording servo control information are provided in recording tracks of the constant angular velocity type optical disk, pairs of wobble pits for tracking servo control being provided in the servo control information area, the wobble pits of each pair being adjacently arranged along one recording track in the servo control information area and provided in a staggered form in a radial direction of said optical disk such that a center axis of said one recording track is disposed between the wobble pits in said each pair, wherein said each pair of wobble pits is free of information therebetween, a track discrimination pit disposed in said servo control information area capable of discriminating between odd and even tracks, wherein each wobble pit between two adjacent recording tracks is shared by the adjacent recording tracks as a wobble pit on an outer circumferential side of one of the adjacent recording tracks and as a wobble pit on an inner circumferential side of the other of the adjacent recording tracks which is situated at an outer circumferential side of said one of the adjacent recording tracks, and said track discrimination pit is disposed on only one of the even and odd tracks at each predetermined area where each said servo control information is sampled at a predetermined timing in said servo control information area, said reproducing method comprising the steps of:

detecting reflected light signals from the respective wobble pits and the data information area such that the servo control information in said each predetermined area in said servo control information area is respectively sampled at the predetermined timing;

generating a tracking error signal by subtracting the value of the detected light signal of one of the pair of wobble pits from the value of the detected light signal of the other of the pair of wobble pits and by selectively inverting the subtracted value in dependency upon whether a track subject to tracking is the odd track or the even track according to said track discrimination pit;

conducting a tracking servo control on the basis of the generated tracking error signal; and reproducing data information from the detected light signal of the data information area while conducting the tracking servo control.

13. The reproducing method for a double density recorded constant angular velocity type optical disk of claim 12 wherein a pitch between said recording tracks as measured along a radius of the optical disk is substantially equal to twice the width of the wobble pits.

14. The reproducing method for a double density recorded constant angular velocity type optical disk of claim 12 wherein each pair of wobble pits includes a first wobble pit and a second wobble pit, wherein said first wobble pit is on a first circumferential side of a given recording track and said second wobble pit is at an immediately successive data position on a second circumferential side of said given recording track.

15. The reproducing method for a double density recorded constant angular velocity type optical disk of claim 12 wherein respective wobble pits chosen from a plurality of pairs lie on a line perpendicular to aid recording tracks along a radius of the optical disk.

16. The reproducing method for a double density recorded constant angular velocity type optical disk in accordance with claim 12 comprising the further step of forming a laser beam spot having a predetermined diameter onto said optical disk to detect the reflected light signals, wherein a pit width of each wobble pit is prescribed such that the predetermined diameter is substantially equal to three times the pit width.

17. The reproducing method according to claim 12, wherein the track discrimination pit comprises a single pit capable of discriminating between the odd and even tracks and, in the tracking error signal generating step, the tracking error signal is generated in dependency upon whether the track subject to tracking is the odd track or the even track according to said single pit.

* * * * *